2,773,060

STEROID KETALS

Robert H. Levin, Kalamazoo Township, Kalamazoo County, and Barney J. Magerlein and A Vern McIntosh, Jr., Kalamazoo, Mich., assignors to The Upjohn Company, Kalamazoo, Mich., a corporation of Michigan No Drawing. Application August 16, 1952, Serial No. 304,851

22 Claims. (Cl. 260—239.55)

This invention relates to the synthesis of certain steroid cyclic ketals and is more particularly concerned with a novel process for preparing 3,20-diketal derivatives of steroid 4-halo-3,20-diketones having a pregnane carbon skeleton, and with the novel compounds thus-produced.

It is an object of the present invention to provide the novel compounds, 3,20-diketal derivatives of steroid 4-halo-3,20-diketones having a pregnane carbon skeleton. Another object of the present invention is the provision of a process for the production of 3,20-diketal derivatives of steroid 4-halo-3,20-diketones having a pregnane carbon skeleton. Another object of the present invention is to provide a method, through the formation of a cyclic ketal, whereby the 3- and 20-positions of a 4-halo-3,20-diketopregnane are blocked so that they are non-reactive during further synthesis. A further object of the invention is the provision of a process for the production of a ketal alpha to a halogen atom in a 4-halo-3,20-diketopregnane. Other objects of the invention will be apparent to one skilled in the art to which this invention pertains.

The novel compounds of the present invention are those represented by the following structural formula:

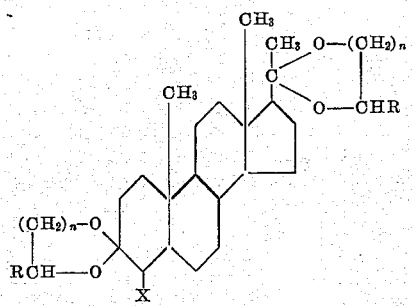

wherein X is a halogen of atomic weight from 35 to 80, i. e., chlorine or bromine, and wherein R is selected from the group consisting of hydrogen and lower-alkyl groups, such as, for example, methyl, ethyl, propyl, isopropyl, butyl, 1-methylpropyl, amyl, hexyl, and the like, and $n$ is one or two. Of these compounds, the lower-alkylene cyclic ketals, formed from 1,2-alkanediols, are preferred.

The pregnane nucleus of the compounds of the present invention may have substitutents such as, for example, ketone, hydroxy, acyloxy, carboxy, carbalkoxy, and the like, attached to one or more of the carbon atoms of the pregnane nucleus such as, for example, in the 6, 7, 11, 12, 17, 21 and other positions. In addition, double bonds may be present in the nucleus in positions such as, for example, 6, 7, 8, 9, 11, 14, 15 and other positions. Other steroid 4-halo-3,20-diketone 3,20-diketals having a pregnane carbon skeleton are also included within the scope of the present invention, it being understood that the above formula is representative only and that the invention is not limited solely thereto.

The novel compounds of the present invention are useful in the synthesis of physiologically active steroids such as cortisone, and are more particularly of interest in the synthesis of 11β-hydroxy steroids such as Kendall's Compound F and esters thereof. For example, Kendall's Compound F acetate is prepared from a 4-halo-17α-hydroxypregnane-3,11,20-trione 3,20-diketal by first reducing the 4-halo-17α-hydroxypregnane-3,11,20-trione 3,20-diketal with lithium aluminum hydride to yield the 11β-hydroxy derivative, which, on partial hydrolysis with sulfuric acid, loses only the 20-ketal group and yields a 4-halo-11β,17α-dihydroxypregnane- 3,20-dione 3-ketal. This characteristic property of enhanced stability of the 3-ketal group is a very valuable and unpredictable property of the new compounds, allowing further transformations in other parts of the molecule. The 21-acetoxy group is then introduced by brominating, with bromine in chloroform, and treating the thus-produced 21-bromide with potassium acetate in acetone. The thus-obtained 4-halo-11β,17α-dihydroxy-21-acetoxypregnane-3,20-dione 3-ketal on treatment with 2,4-dinitrophenylhydrazine in the presence of sulfuric acid results in the formation of the 3-(2,4-dinitrophenylhydrazone) with elimination of hydrogen halide to form a double bond between carbon atoms four and five. Removal of the hydrazone group with pyruvic acid gives Kendall's Compound F acetate. If it is desired to prepare Compound F instead of the acetate, the acetoxylation step is omitted and the 21-bromide is treated with a base to yield a 4-halo-11β,17α,21-trihydroxypregnane-3,20-dione 3-ketal, which on treatment with 2,4-dinitrophenylhydrazine followed by pyruvic acid gives Compound F.

As previously stated, the compounds of the present invention contain an α-halo 3-ketal grouping. These compounds, moreover, are possessive of valuable and hitherto unpredictable properties due to the presence of this group together with the 20-ketal group. It has been found, unexpectedly, that such a grouping has greater stability than either the halogen or the ketal group alone and that it is possible preferentially to remove the 20-ketal group in the compounds of the present invention while the 3-ketal group remains unchanged. For example, the steroid 4-halo-3,20-diketals of the present invention, when treated with dilute acid, lose the 20-ketal group with regeneration of the 20-ketone while the 3-ketal group remains unaffected. Such unpredictable property in the compounds of the invention, the preferential activity of the 20-ketal group over the 3-ketal group, is highly important and of considerable commercial significance, lending especial utility to the compounds of the present invention, since the 20-ketone may then be subjected to further synthesis such as, for example, the introduction of a 21-hydroxy or acyloxy group, without any effect at the 3-position. Thus, the 3,20-diketals of the present invention are of high industrial utility, serving two important functions in the synthesis of other steroids. First, due to the blocking at positions 3 and 20, transformations at other positions of the molecule may be conducted such as, for example, reduction of an 11-ketone to an 11-hydroxyl. This step can then be followed by the preferential removal of the 20-ketal group, which frees the 20-ketone and allows transformations in the side-chain to be accomplished. That the process of the present invention results in the formation of a ketal group alpha to a halogen atom is in itself unpredictable, since analogous reactions are not known to have been conducted previously. Moreover, it is to be expected that the presence of a halogen atom in such close proximity to the ketone would have a hindering influence on reactions of the ketone group, e. g., replacement of the ketone with a cyclic ketal group. Instead, the formation of the α-halo ketal proceeds smoothly and without difficulty, with no disadvantageous hindrance or decomposition of starting material, even in the presence of a strong acid catalyst and at reflux temperature, when conducted within the ranges and under the conditions more fully disclosed hereinafter.

Starting materials for the process of the present invention are steroid 4-halo-3,20-diketones having a pregnane carbon skeleton. In addition to the ketone groups at positions 3 and 20, and the halogen group at position 4, the pregnane carbon skeleton may have other substituents such as, for example, hydroxy, acyloxy, carboxy, carbalkoxy, and the like attached to one or more of the carbon atoms of the pregnane nucleus such as, for example, in the 6, 7, 11, 12, 17, 21 and other positions. Ketone groups, other than those at positions 3 and 20, may also be present in the molecule. Such additional ketone groups, if reactive under the conditions of the reaction, will be converted to ketals, but if the keton groups are non-reactive under the conditions of the reaction such as, for example, the ketone group at position 11, they will be maintained through the reaction. Representative starting materials for the process of the present invention include 4-chloropregnane-3,20-dione, 4-chloro-17α-hydroxypregnane-3,20-dione, 4-chloropregnane-3,11,20-trione, 4-chloro-21-hydroxypregnane-3,20-dione, 4-chloro-11α-hydroxypregnane-3,20-dione, 4-chloro-11β-hydroxypregnane-3,20-dione, 4-chloro-17α-hydroxypregnane-3,11,20-trione, 4-chloro-11α,17α-dihydroxypregnane-3,20-dione, 4-chloro-11β,17α-dihydroxypregnane-3,20-dione, 4-chloro-11α-acetoxy-17α-hydroxypregnane-3,20-dione, 4-chloro-12-hydroxypregnane-3,20-dione, 4-chloro-12-acetoxypregnane-3,20-dione, 4-chloro-11-pregnene-3,20-dione, 4-chloro-9(11)-pregnene-3,20-dione, 4-chloro-6-hydroxypregnane-3,20-dione, 4-chloro-6-acetoxypregnane-3,20-dione, the corresponding 4-bromo compounds, and the like.

According to the method of the present invention, a 4-halo-3,20-diketosteroid having a pregnane carbon skeleton is reacted with an alkane-1,2-diol or an alkane-1,3-diol in the presence of an acid catalyst at a temperature between about twenty and about 200 degrees centigrade, preferably under reflux conditions, to cause conversion of the 3- and 20-ketone groups to ketal groups. In carrying out the process of the present invention, the starting 4-halo-3,20-diketopregnane is admixed, using either order of addition, with at least the theoretical amount of the alkane-1,2-diol or alkane-1,3-diol in an organic solvent, which is non-reactive under the reaction conditions, e. g., at a temperature between about twenty and about 200 degrees centigrade, preferably between about twenty and 150 degrees centigrade. Ordinarily, it is preferred to use an excess of the alkane diol, preferably between about five and about fifty moles per mole of the starting steroid. The time required for reaction is not critical and may be varied between about one and about 24 hours, the length of time being dependent on the temperature, the ketalizing reagent and catalyst employed.

The reaction can be conducted in any organic solvent with which the reactants and products are non-reactive, such as, for example, benzene, toluene, xylene, methylene chloride, petroleum ether, and the like. However, the preferred solvents are those which co-distill with water and hence remove the water as it is formed in the course of the reaction. For this reason the reaction is usually conducted at the reflux temperature of the mixture, such temperature depending, of course, upon the solvent and the particular reaction conditions, e. g., pressure employed.

The ketal-forming agents of the present invention are alkane-1,2-diols and alkane-1,3-diols such as, for example, ethylene glycol, propane-1,2-diol, propane-1,3-diol, butane-1,2-diol, pentane-1,2-diol, 3-methylpentane-1,2-diol, hexane-1,3-diol, octane-1,2-diol, and the like. The catalyst used in the method of the present invention may be any suitable acid catalyst and is preferably a mineral acid or an organic sulfonic acid. Representative catalysts are the meta- and para-toluenesulfonic acids, naphthalenesulfonic acid, benzenesulfonic acid, orthochlorobenzenesulfonic acid, hydrochloric acid, and sulfuric acid, with para-toluenesulfonic acid being the preferred acid catalyst.

The following examples are illustrative of the process and products of the present invention but are not to be construed as limiting.

PREPARATION 1.—4-CHLORO-17α-HYDROXYPREGNANE-3,11,20-TRIONE

A solution of 25 grams of 3α,17α-dihydroxypregnane-11,20-dione [Sarett, J. Am. Chem. Soc., 70, 1454 (1948)] in 380 milliliters of tertiary-butyl alcohol was admixed with five milliliters of concentrated hydrochloric acid and twelve milliliters of water, and thereafter cooled to about fifteen degrees centigrade. Eighteen milliliters (2.2 molar equivalents) of tertiarybutyl hyprochlorite was then added thereto, whereupon the temperature rose to about 26 degrees centigrade. The reaction mixture was stirred for 4.5 hours although the iodometric titration of an aliquot sample taken from the reaction mixture after two hours showed the reaction to be essentially complete. The volatile components of the reaction mixture were removed by distillation at reduced pressure leaving a 24.59 gram residue (a yield of 90.6 percent of the theoretical, corrected for the samples taken from the reaction mixture for iodometric titrations) of 4-chloro-17α-hydroxypregnane-3,11,20-trione, melting without purification at 220 to 225 degrees centigrade and having an $[\alpha]_D$ of plus 91 degrees (acetone).

The corresponding 4-bromo compound is prepared according to the procedure of Kritchevsky et al. [J. Am. Chem. Soc., 74, 483 (1952)].

*Example 1.—4-chloro-17α-hydroxypregnane-3,11,20-trione 3,20-ethylene glycol diketal*

A solution of five grams of 4-chloro-17α-hydroxypregnane-3,11,20-trione, ten milliliters of ethylene glycol, 0.30 gram of para-toluenesulfonic acid monohydrate and 500 milliliters of benzene was placed in a reaction flask which was equipped with a reflux condenser and a water trap so arranged that the condensed vapors passed through the water trap before returning to the reaction flask. The mixture was heated to reflux and was allowed to reflux for six hours while at the same time being agitated. The water which formed was removed by co-distillation with benzene and was collected in the water trap. The reaction mixture was cooled, washed with a dilute solution of sodium bicarbonate and with water, and then dried and concentrated to dryness under reduced pressure. The white crystalline residue was dissolved in 85 milliliters of ethyl acetate and the solution was cooled until crystallization took place. The crystalline 4-chloro-17α-hydroxypregnane-3,11,20-trione 3,20-ethylene glycol diketal was isolated by filtration and weighed 1.986 grams; melting point 232 to 236 degrees centigrade. A second crop of 1.928 grams, melting point 232 to 235 degrees centigrade, was obtained by concentration of the mother liquor. The two crops were combined and recrystallized from methylene chloride-hexane, benzene, and ethyl acetate to yield purified product of melting point 239 to 242 degrees centigrade; $[\alpha]_D^{23}$ plus 55 degrees (acetone).

*Analysis.*—Calculated for $C_{25}H_{37}O_6Cl$: C, 64.02; H, 7.95; Cl, 7.56. Found: C, 64.57; H, 7.86; Cl, 7.55.

*Example 2.—4-chloro-11β,17α-dihydroxypregnane-3,20-dione 3,20-ethylene glycol diketal*

To a solution of thirteen grams of lithium aluminum hydride in one liter of anhydrous ether was added, with stirring, a solution of 13.79 grams of 4-chloro-17α-hydroxypregnane-3,11,20-trione 3,20-ethylene glycol diketal (from Example 1) in 200 milliliters of benzene. The reaction mixture was stirred at room temperature for one hour and was then heated at reflux for an additional hour. After cooling, the mixture was hydrolyzed by the cautious addition of a solution of 100 milliliters of hydrochloric acid in 150 milliliters of water. Stirring at room temperature was continued for several hours, after which the organic layer was separated and the water layer was extracted with methylene chloride. The methylene chloride extract was combined with the organic layer and the whole was washed with water and dilute sodium bicarbonate solution, dried and evaporated to dryness. The residue was triturated with ether and yielded 8.38 grams of 4-chloro-11β,17α-dihydroxypregnane-3,20-dione 3,20-ethylene glycol diketal; melting point 212 to 218 degrees centigrade. An additional 1.51 grams was obtained from the ether mother liquor. Several recrystallizations from a mixture of ethyl acetate-hexane gave purified material melting at 222 to 224 degrees centigrade.

*Analysis.*—Calculated for $C_{25}H_{39}O_6Cl$: C, 63.74; H, 8.35; Cl, 7.53. Found: C, 63.80; H, 8.30; Cl, 7.35.

The same compound, 4-chloro-11β,17α-dihydroxypregnane-3,20-dione 3,20-ethylene glycol diketal, having physical properties corresponding in all respects to those given above, is also prepared by reacting 4-chloro-11β,17α-dihydroxypregnane-3,20-dione with ethylene glycol in the presence of para-toluenesulfonic acid, according to the procedure of Example 1.

*Example 3.—4-chloropregnane-3,20-dione 3,20-ethylene glycol diketal*

In essentially the same manner as given in Example 1, 4-chloropregnane-3,20-dione 3,20-ethylene glycol diketal having a melting point of 131 to 137 degrees centigrade, was prepared by reaction of 4-chloropregnane-3,20-dione with ethylene glycol in the presence of para-toluenesulfonic acid.

*Example 4.—4-chloro-17α-hydroxypregnane-3,11,20-trione 3,20-propane-1,2-diol diketal*

In the same manner as given in Example 1, 0.4 gram of 4-chloro-17α-hydroxypregnane-3,11,20-trione 3,20-propane-1,2-diol diketal was prepared using a mixture of one gram of 4-chloro-17α-hydroxypregnane-3,11,20-trione, five milliliters of propane-1,2-diol, 100 milligrams of para-toluenesulfonic acid, and 100 milliliters of benzene. The product, after crystallization from acetone-water, melted at 183 to 195 degrees centigrade; $[\alpha]_D^{24}$ plus 73 degrees (benzene).

*Analysis.*—Calculated for $C_{27}H_{41}O_6Cl$: C, 65.24; H, 8.31. Found: C, 65.23; H, 8.47.

*Example 5.—4-chloro-17α-hydroxypregnane-3,11,20-trione 3,20-propane-1,3-diol diketal*

In the same manner as given in Example 1, 0.69 gram of 4-chloro-17α-hydroxypregnane-3,11,20-trione 3,20-propane-1,3-diol diketal was prepared using a mixture of one gram of 4-chloro-17α-hydroxypregnane-3,11,20-trione, two milliliters of propane-1,3-diol, 100 milligrams of para-toluenesulfonic acid, and 100 milliliters of benzene. The product, after crystallization from benzene-hexane, melted at 205 to 208 degrees centigrade, $[\alpha]_D^{24}$ plus 58 degrees (benzene).

*Analysis.*—Calculated for $C_{27}H_{41}O_6Cl$: C, 65.24; H, 8.31. Found: C, 65.60; H, 8.35.

*Example 6.—4-bromo-17α-hydroxypregnane-3,11,20-trione 3,20-propane-1,2-diol diketal*

In the same manner as given in Example 1, 4-bromo-17α-hydroxypregnane-3,11,20-trione 3,20-propane-1,2-diol diketal is prepared using a mixture of 1.5 millimoles of 4-bromo-17α-hydroxypregnane-3,11,20-trione, 28 millimoles of propane-1,2-diol, fifty milligrams of para-toluenesulfonic acid monohydrate and fifty milliliters of benzene.

*Example 7.—4-bromo-11β,17α-dihydroxypregnane-3,20-dione 3,20-propane-1,2-diol diketal*

In the same manner as given in Example 2, 4-bromo-11β,17α-dihydroxypregnane-3,20-dione 3,20-propane-1,2-diol diketal is prepared from 4-bromo-17α-hydroxypregnane-3,11,20-trione 3,20-propane-1,2-diol diketal by reducing the 11-ketone with lithium aluminum hydride.

4-bromo-11β,17α-dihydroxypregnane-3,20-dione 3,20-propane-1,2-diol diketal is also prepared by reacting 4-bromo-11β,17α-dihydroxypregnane-3,20-dione with propane-1,2-diol in the presence of para-toluenesulfonic acid, according to the procedure of Example 1.

*Example 8.—4-bromopregnane-3,11,20-trione 3,20-(3-methylpentane-1,2-diol) diketal*

In the same manner as given in Example 1, 4-bromopregnane-3,11,20-trione 3,20-(3-methylpentane-1,2-diol) diketal is prepared from 4-bromopregnane-3,11,20-trione [prepared from pregnane-3,11,20-trione (Hager and Reichstein, Helv. Chim, Acta, 26, 721 (1943)) by bromination, with bromine, at the 4-position] by using 3-methylpentane-1,2-diol instead of ethylene glycol and using naphthalenesulfonic acid instead of para-toluenesulfonic acid.

*Example 9.—4-bromo-12-hydroxypregnane-3,20-dione 3,20-propane-1,3-diol diketal*

In the same manner as given in Example 1, 4-bromo-12-hydroxypregnane-3,20-dione 3,20-propane-1,3-diol diketal is prepared from 4-bromo-12-hydroxypregnane-3,20-dione [prepared from 12-hydroxypregnane-3,20-dione (Reichstein et al., Helv. Chim. Acta, 27, 821 (1944)) by bromination, with bromine, at the 4-position] by using propane-1,3-diol in place of ethylene glycol.

*Example 10.—4 chloro-11α,17α-dihydroxypregnane-3,20-dione 3,20-ethylene glycol diketal*

In the same manner as given in Example 1, 4-chloro-11α,17α-dihydroxypregnane-3,20-dione 3,20-ethylene glycol diketal is prepared from 4-chloro-11α,17α-dihydroxypregnane-3,20-dione by reaction with ethylene glycol in the presence of para-toluene-sulfonic acid. The starting material, 4-chloro-11α,17α-dihydroxypregnane-3,20-dione can be prepared from 3α,17α-dihydroxypregnane-11,20-dione [Kritchevsky et al., J. Am. Chem. Soc., 74, 483 (1952)] by reaction with ethylene glycol in the presence of para-toluenesulfonic acid to form the 20-monoketal which on reduction with lithium aluminum hydride gives a mixture of 3α,11α,17α-trihydroxypregnan-20-one 20-ethylene glycol ketal and 3α,11β,17α-trihydroxypregnan-20-one 20-ethylene glycol ketal. The 11α-isomer is then treated with dilute hydrochloric acid to remove the 20-ketal group and yield 3α,11α,17α-trihydroxypregnan-20-one which on oxidation-chlorination, according to Preparation 1, yields 4-chloro-11α,17α-dihydroxypregnane-3,20-dione.

In the same manner as given in the above examples, starting from the appropriate 3,20-dione, other 4-halo-3,20-diketopregnane 3,20-diketals are prepared, including 4-chloropregnane-3,20-dione, 3,20-propane-1,3-diol diketal, 4-chloropregnane-3,20-dione 3,20-octane-1,3-diol diketal, 4-chloropregnane-3,20-dione 3,20-butane-1,2-diol diketal 4-chloro-17α-hydroxypregnane-3,20-dione 3,20-ethylene glycol diketal, 4-chloro-17α-hydroxy-pregnane-3,20-dione, 3,20-propane-1,2-diol diketal, 4-chloro-17α-hydroxy pregnane-3,20-dione 3,20-pentane-1,2-diol diketal, 4-chloropregnane-3,11,20-trione 3,20-ethylene glycol diketal, 4-chloropregnane-3,11,20-trione 3,20-butane-1,3-diol diketal, 4-chloro-21-hydroxypregnane-3,20-dione 3,20-ethylene glycol diketal, 4-chloro-11α-hydroxypregnane-3,20-dione 3,20-ethylene glycol diketal, 4-chloro-11α-hydroxypregnane-3,20-dione 3,20-hexane-1,2-diol diketal, 4-chloro-11β-hydroxypregnane-3,20-dione 3,20-ethylene glycol diketal, 4-chloro-11α,17α-dihydroxypregnane-3,20-dione 3,20-propane-1,2-diol diketal, 4-chloro - 11α,17α - dihydroxypregnane - 3,20 - dione 3,20-propane - 1,3 - diol diketal, 4 - chloro - 11α,17α - dihydroxypregnane-3,20-dione 3,20-butane-1,2-diol diketal, 4-chloro-11α - acetoxy - 17α - hydroxypregnane - 3,20-dione 3,20-ethylene glycol diketal, 4-chloro-11α-acetoxy-17α - hydroxypregnane - 3,20 - dione 3,20 - butane - 1,3-diol diketal, 4-chloro-12-acetoxypregnane-3,20-dione 3,20-butane-1,3-diol diketal, 4-chloro-12-acetoxypregnane-3,20-dione 3,20-ethylene glycol diketal, 4-chloro-6-acetoxypregnane-3,20-dione 3,20-ethylene glycol diketal, 4-chloro-11-pregnene-3,20-dione 3,20-ethylene glycol diketal, 4-chloro-9(11)-pregnene-3,20-dione 3,20-ethylene glycol diketal, the coresponding 4-bromo diketals, and others.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for the production of a steroid 4-halo-3,20-dione 3,20-cyclic diketal which comprises: mixing together an organic ketal-forming agent selected from the group consisting of alkane-1,2-diols and alkane-1,3-diols, containing from two to eight carbon atoms, inclusive, and a steroid 4-halo-3,20-dione having a pregnane carbon skeleton the 21-carbon atom of which is substituted by three hydrogen atoms, wherein the halogen is of atomic weight from 35 to 80, in the presence of an acid catalyst at a temperature between about twenty and about 200 degrees centigrade, to cause conversion of the 3- and 20-ketone groups to ketal groups.

2. A process for the production of a 4-halopregnane-3,20-dione 3,20-cyclic diketal which comprises: mixing together an organic ketal-forming agent selected from the group consisting of alkane-1,2-diols and alkane-1,3-diols, containing from two to eight carbon atoms, inclusive, and a 4-halopregnane-3,20-dione the 21-carbon atom of which is substituted by three hydrogen atoms, wherein the halogen is of atomic weight between 35 and 80, in the presence of an acid catalyst selected from the group consisting of organic sulfonic acids and mineral acids, at a temperature between about twenty and about 200 degrees centigrade, to cause conversion of the 3- and 20-ketone groups to ketal groups.

3. A process for the production of a 4-halopregnane-3,20-dione 3,20-cyclic diketal which comprises: mixing together a lower-alkylene glycol and a 4-halopregnane-3,20-dione the 21-carbon atom of which is substituted by three hydrogen atoms, wherein the halogen is of atomic weight from 35 to 80, in the presence of para-toluenesulfonic acid at a temperature between about twenty and about 150 degrees centigrade, to cause conversion of the 3- and 20-ketone groups to ketal groups.

4. A process for the production of a 4-halo-17α-hydroxypregnane-3,11,20-trione 3,20-diketal which comprises: mixing together an organic ketal-forming agent selected from the group consisting of alkane-1,2-diols and alkane-1,3-diols, containing from two to eight carbon atoms, inclusive, and 4 - halo - 17α - hydroxypregnane-3,11,-20-trione, wherein the halogen is of atomic weight from 35 to 80, in the presence of an acid catalyst at a temperature between about twenty and about 200 degrees centigrade, to cause conversion of the 3- and 20-ketone groups to ketal groups.

5. A process for the production of a 4-halo-11α-hydroxypregnane-3,20-dione 3,20-diketal which comprises: mixing together an organic ketal-forming agent selected from the group consisting of alkane-1,2-diols and alkane-1,3-diols, containing from two to eight carbon atoms, inclusive, and 4 - halo - 11α - hydroxypregnane - 3,20 - dione, wherein the halogen is of atomic weight from 35 to 80, in the presence of an acid catalyst at a temperature between about twenty and about 200 degrees centigrade, to cause conversion of the 3- and 20-ketone groups to ketal groups.

6. A process for the production of a 4-halo-11β,17α-dihydroxy-pregnane-3,20-dione 3,20-diketal which comprises: mixing together an organic ketal-forming agent selected from the group consisting of alkane-1,2-diols and alkane-1,3-diols, containing from two to eight carbon atoms, inclusive, and 4-halo-11β,17α-dihydroxypregnane-3,20-dione, wherein the halogen is of atomic weight from 35 to 80, in the presence of an acid catalyst at a temperature between about twenty and about 200 degrees centigrade, to cause conversion of the 3- and 20-ketone groups to ketal groups.

7. A process for the production of 4-halo-11α,17α-dihydroxy-pregnane-3,20-dione 3,20-diketal wich comprises: mixing together an organic ketal-forming agent selected from the group consisting of alkane-1,2-diols and alkane-1,3-diols, containing from two to eight carbon atoms, inclusive, and 4 - halo-11α,17α-dihydroxy-pregnane-3,20-dione, wherein the halogen is of atomic weight from 35 to 80, in the presence of an acid catalyst at a temperature between about twenty and about 200 degrees centigrade, to cause conversion of the 3- and 20-ketone groups to ketal groups.

8. A process for the production of 4-chloro-17α-hydroxypregnane-3,11,20-trione 3,20-ethylene glycol diketal, which comprises: mixing together ethylene glycol and 4-chloro-17α-hydroxypregnane-3,11,20-trione in the presence of para-toluenesulfonic acid and at a temperature between about twenty and about 150 degrees centigrade.

9. A process for the production of 4-chloro-11β,17α-dihydroxypregnane - 3,20 - dione 3,20 - ethylene glycol diketal, which comprises: mixing together ethylene glycol and 4-chloro-11β,17α-dihydroxypregnane-3,20-dione in the presence of para-toluenesulfonic acid and at a temperature between about twenty and about 150 degrees centigrade.

10. A process for the production of 4-chloro-11α,17α-dihydroxypregnane-3,20-dione 3,20-ethylene glycol diketal, which comprises: mixing together ethylene glycol an and 4-chloro-11α,17α-dihydroxypregnane-3,20-dione in the presence of para-toluenesulfonic acid and at a temperature between about twenty and about 150 degrees centigrade.

11. A process for the production of 4-chloro-17α-hydroxypregnane-3,11,20-trione 3,20-propane-1,2-diol diketal, which comprises: mixing together propane-1,2-diol and 4-chloro-17α-hydroxypregnane-3,11,20-trione in the presence of para-toluenesulfonic acid and at a temperature between about twenty and about 150 degrees centigrade.

12. 4-halo-11α,17α-dihydroxypregnane-3,20-dione 3,20-ethylene glycol diketals, wherein the halogen is of atomic weight from 35 to 80, which may be represented by the formula

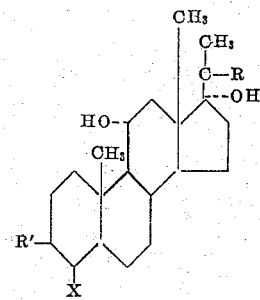

wherein R and R' are ethylene glycol ketal groups and X is halogen as defined above.

13. 4-halo-11β,17α-dihydroxypregnane-3,20-dione 3,20-ethylene glycol diketals, wherein the halogen is of atomic weight from 35 to 80, which may be represented by the formula

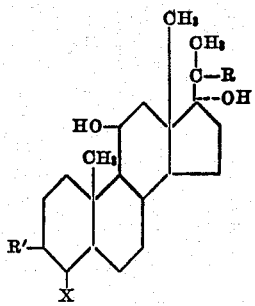

wherein R and R' are ethylene glycol ketal groups and X is halogen as defined above.

14. 4-halo-17α-hydroxypregnane-3,11,20 - trione 3,20-ethylene glycol diketals, wherein the halogen is of atomic weight from 35 to 80, which may be represented by the formula

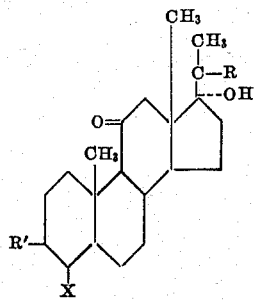

wherein R and R' are ethylene glycol ketal groups and X is halogen as defined above.

15. 4-halopregnane-3,20-dione 3,20 - ethylene glycol diketals, wherein the halogen is of atomic weight from 35 to 80, which may be represented by the formula

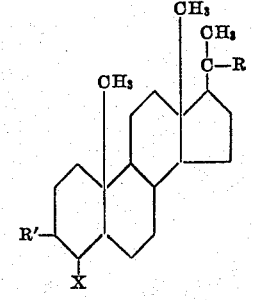

wherein R and R' are ethylene glycol ketal groups and X is halogen as defined above.

16. 4-chloro-17α-hydroxypregnane-3,11,20-trione 3,20-ethylene glycol diketal.

17. 4-chloro-17α-hydroxypregnane-3,11,20-trione 3,20-propane-1,2-diol diketal.

18. 4 - chloro - 11β,17α - dihydroxypregnane-3,20-dione 3,20-ethylene glycol diketal.

19. 4 - chloro - 11α,17α - dihydroxypregnane-3,20-dione 3,20-ethylene glycol diketal.

20. 4-chloropregnane-3,20-dione 3,20-ethylene glycol diketal.

21. A 3,20-cyclic diketal of a steroid 4-halo-3,20-dione represented by the following general formula:

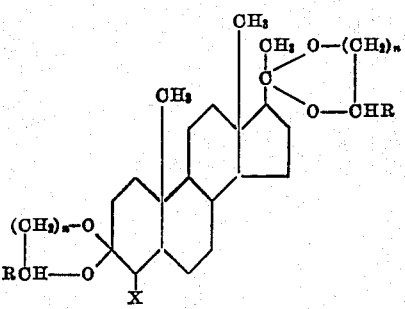

wherein X is a halogen of atomic weight from 35 to 80, R is a member of the group consisting of hydrogen and a lower-alkyl group, and $n$ is an integer from one to two, inclusive, and wherein the 11-position contains a substituent selected from hydrogen, α-hydroxy, β-hydroxy and keto, and the 17-position contains a substituent selected from hydrogen and α-hydroxy.

22. A process for the production of a steroid 4-halo-3,20-dione 3,20-cyclic diketal which comprises: mixing together an organic ketal-forming agent selected from the group consisting of alkane-1,2-diols and alkane-1,3-diols, containing from two to eight carbon atoms, inclusive, and a steroid 4-halo-3,20-dione having the following basic general formula:

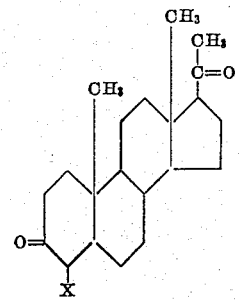

wherein X is a halogen of atomic weight from 35 to 80, in the presence of an acid catalyst at a temperture between about twenty and about 200 degrees centigrade, to cause conversion of the 3- and 20-ketone groups to ketal groups.

References Cited in the file of this patent
UNITED STATES PATENTS

| | | |
|---|---|---|
| 2,153,700 | Serini | Apr. 11, 1939 |
| 2,256,500 | Serini | Sept. 23, 1941 |
| 2,288,854 | Stavely | July 7, 1942 |
| 2,302,636 | Koster | Nov. 17, 1942 |
| 2,356,154 | Fernholz | Aug. 22, 1944 |
| 2,510,940 | Sarett | June 13, 1950 |
| 2,541,104 | Sarett | Feb. 13, 1951 |
| 2,541,105 | Sarett | Feb. 13, 1951 |
| 2,622,801 | Bernstein | Dec. 16, 1952 |

OTHER REFERENCES

Antonucci: J. of Org. Chem., vol. 17, No. 10, October 1952, pp. 1341–50 and 1369–74, received Apr. 14, 1952.